(12) United States Patent
Holtzman et al.

(10) Patent No.: US 10,198,954 B2
(45) Date of Patent: Feb. 5, 2019

(54) METHOD AND APPARATUS FOR POSITIONING AN UNMANNED ROBOTIC VEHICLE

(71) Applicant: MOTOROLA SOLUTIONS, INC., Schaumburg, IL (US)

(72) Inventors: Guy Holtzman, Tel Aviv (IL); Baruh Hason, Tel Aviv-Yaffo (IL); Salomon Serfaty, Gaash (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 371 days.

(21) Appl. No.: 14/985,121

(22) Filed: Dec. 30, 2015

(65) Prior Publication Data
US 2017/0193828 A1 Jul. 6, 2017

(51) Int. Cl.
| | |
|---|---|
| G08G 5/00 | (2006.01) |
| B64C 39/02 | (2006.01) |
| G05D 1/00 | (2006.01) |
| H04N 7/18 | (2006.01) |
| G06K 9/00 | (2006.01) |

(Continued)

(52) U.S. Cl.
CPC ......... G08G 5/0069 (2013.01); B64C 39/024 (2013.01); G05D 1/0088 (2013.01); G06K 9/0063 (2013.01); G06Q 50/30 (2013.01); G08G 5/0013 (2013.01); G08G 5/0078 (2013.01); H04N 7/185 (2013.01); B64C 2201/127 (2013.01); B64C 2201/141 (2013.01)

(58) Field of Classification Search
None
See application file for complete search history.

(56) References Cited

U.S. PATENT DOCUMENTS

| | | | |
|---|---|---|---|
| 8,346,578 B1 | 1/2013 | Hopkins, III et al. | |
| 8,775,341 B1 * | 7/2014 | Commons | G06N 3/0454 706/20 |

(Continued)

OTHER PUBLICATIONS

Lou et al. "3-D Model-Based Vehicle Tracking" published in: IEEE Transactions on Image Processing (vol. 14, Issue: 10, Oct. 2005) (Year: 2005).*

(Continued)

*Primary Examiner* — Todd M Melton
*Assistant Examiner* — Jason R Roberson (57) ABSTRACT

A method and apparatus are provided for positioning an unmanned robotic vehicle (URV). The URV captures a set of one or more of image and non-image information of an object while positioned at a first position, provides the set of image/non-image information to a server entity, in response to providing the set of image/non-image information, receives a three-dimensional (3D) model associated with the object, autonomously determines a second position based on the 3D model, and autonomously navigates to the second position. At the second position, the URV may capture further image and/or non-image information and, based on the further captured image/non-image information, autonomously determine, and navigate to, a third position. The steps of capturing further image and/or non-image information and, based on the captured image and/or non-image information, autonomously determining and navigating to further positions may be repeated indefinitely, or until otherwise instructed.

18 Claims, 5 Drawing Sheets

(51) Int. Cl.
  *G06Q 50/30* (2012.01)
  *G06T 7/00* (2017.01)

(56) References Cited

U.S. PATENT DOCUMENTS

| | | | |
|---|---|---|---|
| 9,020,200 B2 | 4/2015 | Fan et al. | |
| 9,082,038 B2 | 7/2015 | Kozitsky et al. | |
| 9,164,511 B1* | 10/2015 | Ferguson | G05D 1/0231 |
| 9,471,059 B1* | 10/2016 | Wilkins | G05D 1/0016 |
| 2006/0269105 A1 | 11/2006 | Langlinais | |
| 2009/0213219 A1* | 8/2009 | Eggert | G06T 7/277 |
| | | | 348/148 |
| 2016/0042637 A1* | 2/2016 | Cahill | G08B 25/10 |
| | | | 701/3 |
| 2017/0103487 A1* | 4/2017 | Channah | G06Q 50/265 |

OTHER PUBLICATIONS

Krahnstoever et al. "Appearance management and cue fusion for 3D model-based tracking" Published in: Computer Vision and Pattern Recognition, 2003. Proceedings. 2003 IEEE Computer Society Conference (Year: 2003).*

* cited by examiner

METHOD AND APPARATUS FOR POSITIONING AN UNMANNED ROBOTIC VEHICLE

FIELD OF THE INVENTION

The present invention relates generally to unmanned robotic vehicles, and, in particular, to positioning an unmanned robotic vehicle in proximity to an object.

BACKGROUND OF THE INVENTION

There is no such thing as a routine traffic stop, as public safety officers continue to get hurt or killed while conducting them. For example, the Federal Bureau of Investigation's (FBI) Law Enforcement Officers Killed and Assaulted (LEOKA) statistics estimate that between 2001 and 2010, 95 public safety officers died during traffic stops and 4,752 were assaulted.

A traffic stop is always an at-risk situation because one never knows who is in the vehicle and what the intentions are of the vehicle's occupants. Further, one also does not know what objects, such as guns, may be inside the vehicle and how any such objects can be used against a public safety officer. Additionally, in high-risk traffic stops, such as may result from pursuit of a vehicle believed to have been involved in a felony crime, approaching the vehicle may pose an extreme risk to the public safety officer. With advanced artificial intelligence, machine learning, and robotics, some of these risks may be mitigated by allowing some actions to be undertaken by an unmanned robotic vehicle.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION OF THE INVENTION

A method and apparatus are provided for positioning an unmanned robotic vehicle (URV). The URV captures a set of one or more of image and non-image information, that is, a set of image and/or non-image information, associated with an object of interest while positioned at a first position, provides the set of image and/or non-image information to a server entity, in response to providing the set of image and/or non-image information, receives a three-dimensional (3D) model associated with the object, autonomously determines a second position based on the 3D model, and autonomously navigates to the second position. At the second position, the URV may capture further image and/or non-image information and, based on the further captured image and/or non-image information, autonomously determine, and navigate to, a third position. The steps of capturing further image and/or non-image information and, based on the captured image and/or non-image information, autonomously determining, and navigating to, further positions may be repeated indefinitely, or until otherwise instructed. Thus, the information collected by the URV and information returned to the URV by the server entity may allow a public safety responder to better assess a situation with respect to the object and determine follow up actions while minimizing personal risk to the public safety responder, such as calling for back up without having to first approach the vehicle on foot.

Generally, an embodiment of the present invention encompasses a method for positioning a URV. The method includes capturing, by the URV, a set of one or more of image and non-image information associated with an object while positioned at a first position; providing, by the URV, the set of one or more of image and non-image information to a server entity; in response to providing the set of one or more of image and non-image information, receiving, by the URV, a three-dimensional model associated with the object; autonomously determining, by the URV, a second position based on the three-dimensional model; and autonomously navigating the URV to the second position.

Another embodiment of the present invention encompasses a URV that includes a processor, a propulsion system, one or more wireless interfaces, one or more sensors, an image capturing device, and an at least one memory device. The at least one memory device is configured to store a set of instructions that, when executed by the processor, cause the processor to perform the following functions: capture, via one or more of the image capture device and the one or more sensors, a set of one or more of image and non-image information associated with an object while positioned at a first position; provide the set of one or more of image and non-image information to a server entity; in response to providing the set of one or more of image and non-image information, receive a three-dimensional model associated with the object; autonomously determine a second position based on the three-dimensional model; and autonomously navigate, via the propulsion system, the URV to the second position.

Figure 1:
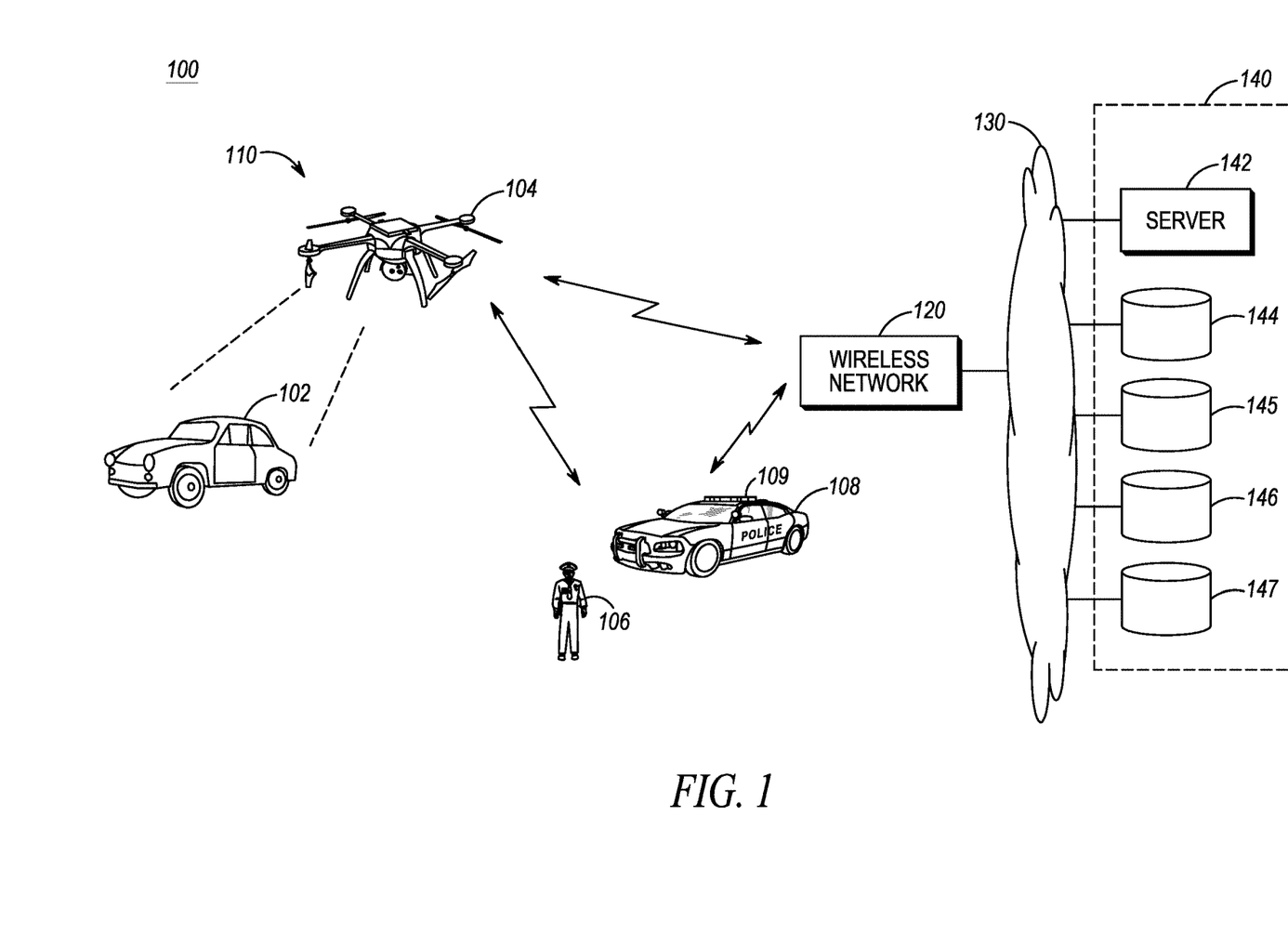
FIG. 1 is a block diagram of a wireless communication system in accordance with some embodiments of the present invention.

The present invention may be more fully described with reference to FIGS. 1-4B. FIG. 1 is a block diagram of a wireless communication system 100 in accordance with some embodiments of the present invention. Communication system 100 includes an incident scene 110 comprising an object or vehicle of interest 102. Communication system 100 further includes a mobile unmanned robotic vehicle (URV) 104, such as an unmanned ground vehicle (UGV) or an unmanned aerial vehicle (UAV) (depicted in FIG. 1 as a UAV), for example, a drone or a flying remote-controlled robot, that is equipped with various sensors and data capture devices for acquiring data and images with respect to object/vehicle 102. Communication system 100 further includes one or more public safety responders 106, 108, such as a public safety responder 106 on foot or as a public safety responder 108 located inside a public safety response vehicle 109, for example, a police car, a fire truck, a hazardous materials response vehicle, or a command VAN, which public safety responders 106, 108 and URV 104 are located at or near incident scene 110 and are in wireless communication with the URV.

Communication system 100 further includes a wireless communication network 120 that provides wireless services to communication devices within a coverage area of the wireless communication network, such as URV 104 and mobile devices of public safety responders 106, 108. Communication system 100 further includes a public safety agency 140, such as a police department or a fire department, that is in communication with wireless communication network 120 via a data network 130, such as the Internet and/or an enterprise or public safety agency network, and, via the wireless communication network and data network, with URV 104 and public safety responders 106 and 108. In some embodiments of the present invention, the public safety response vehicle 109 of public safety responder 108 may include a digital vehicular repeater system (DVRS) capable of relaying communications between wireless communications network 120 and each of URV 104 and public safety responders 106 and 108 and/or may include ultrasonic and/or ultra-wideband transmitter/receiver circuitry capable of engaging in wireless communications with ultrasonic and/or ultra-wideband transmitter/receiver circuitry of URV 104. Collectively, wireless communications network 120, data network 130, and public safety agency 140 are an infrastructure of communication system 100 and elements of the wireless communications network, data network, and public safety agency may be referred to as infrastructure elements of communication system 100.

Wireless communication network 120 includes a radio access network (RAN) comprising one or more wireless access nodes (not shown), such as an access point, a base station, and an eNodeB, which RAN is in communication with a core network (not shown). Wireless communication network 120 may operate in accordance with any wireless communication technology that supports data applications. For example, wireless communication network 120 may be a public safety (PS) network that can utilize, for example, Long Term Evolution (LTE), Enhanced Voice-Data Optimized (EVDO), IEEE 802.11 and variants thereof ("Wi-Fi"), Project 25 (P25), Digital Mobile Radio (DMR), Land Mobile Radio (DMR), Terrestrial Trunked Radio (TETRA), etc.

Public safety agency 140 includes an infrastructure-based server entity, or server, 142 that implements an image processing system and one or more databases 144-147 (four shown) accessible by the server and that are repositories of public safety content; however, in other embodiments of the present invention, server 142 and the one or more public safety content databases 144-147 may be located at public safety response vehicle 109 and may be accessible via the DVRS of the public safety response vehicle. The functions described herein as performed by server 142 and the one or more public safety content databases 144-147 are not specific to where the server and databases are located; that is, instead of or in addition to infrastructure-based servers and databases, the server and databases may be vehicle-based, that is, located in public safety response vehicle 109, or URV-based, that is, located in URV 104, or the functions described herein as performed by server 142 and the one or more public safety content databases 144-147 may be distributed among the public safety response vehicle 109, the infrastructure of public safety agency 140, and/or URV 104, for example, server 142 may be located in URV 104 or public safety response vehicle 109 and the one or more databases 144-147 respectively may be located in public safety response vehicle 109 or the infrastructure of the public safety agency, or server 142 and one or more of public safety content databases 144-147 may be located in the public safety response vehicle 109 and other databases of the one or more public safety content databases 144-147 may be located in the infrastructure of the public safety agency.

A first database 144 of the one or more databases 144-147 maintains three-dimensional (3D) models of objects or vehicles that may be of interest. For example, database 144 may be a vehicle make and model database that maintains vehicle make and model information and two-dimensional (2D) and 3D images of various vehicle makes and models. In response to a query comprising identification information of a vehicle, such as an image of a vehicle captured by URV 104, database 144 identifies the vehicle in the image and returns vehicle make and model information as well as a 3D image of the vehicle. In other embodiments of the present invention, database 144 may be a weapons database that, in response to a query comprising identification information of a weapon, such as an image of a gun or an explosive device captured by URV 104, identifies the weapon in the image and returns weapon make and model information as well as a 3D image of the weapon. Other databases of the one or more databases 144-147 maintain further public safety-related information that may be used by URV 104 and/or public safety responders 106 and 108 to obtain public safety information that facilitates a determination of follow-up actions to be undertaken by URV 104 or the public safety responders. For example, a second database 145 of the multiple databases 144-147 may be a vehicle registration database, for example, a Department of Motor Vehicles (DMV) database, that maintains vehicle registration information and driver's license information, such as license plate information (for example, license plate numbers and states) that is stored in association with information for an individual(s) to whom each such license plate is registered, such as the driver's license information for such an individual. By way of further examples, a third database 146 of the multiple databases 144-147 may be a weapons (in the event that database 144 is other than a weapons database), explosive device, and/or chemical material database (such as a hazardous materials (hazmat) database and/or an illegal substance database) that maintains images of various weapons and explosive devices, a make and model information associated with each such weapon/explosive devices, and/or chemical identification and potential use information, and a fourth database 147 of the multiple databases 144-147 may be a criminal records database, such as a Records Management Service (RMS) database as known in the art. In some embodiments of the present invention, one or more of the multiple databases 144-147 may be included in server 142.

Server 142 is designed to allow full use of incident scene 110 images captured by URV 104, including an ability to analyze the operational characteristics of incident scene 110 and an ability to analyze images of objects, vehicles, vehicle license plates, vehicle occupants, and detected weapons. More particularly, server 142 includes a server entity that may collect, process, and store data in a database of the server and one or more search engines that may search the one or more databases of communication system 100 in response to receiving an image from URV 104 and/or public safety responders 106 and 108. In other embodiments of the present invention, one or more of the search engines may be external to, and in communication with, server 142, for example, may be included in one or more of public safety content databases 144-147. Server 142 is connected to data network 130 via any of a wireless, wireline, or optical connection, or any other connection known in the art.

Figure 2:
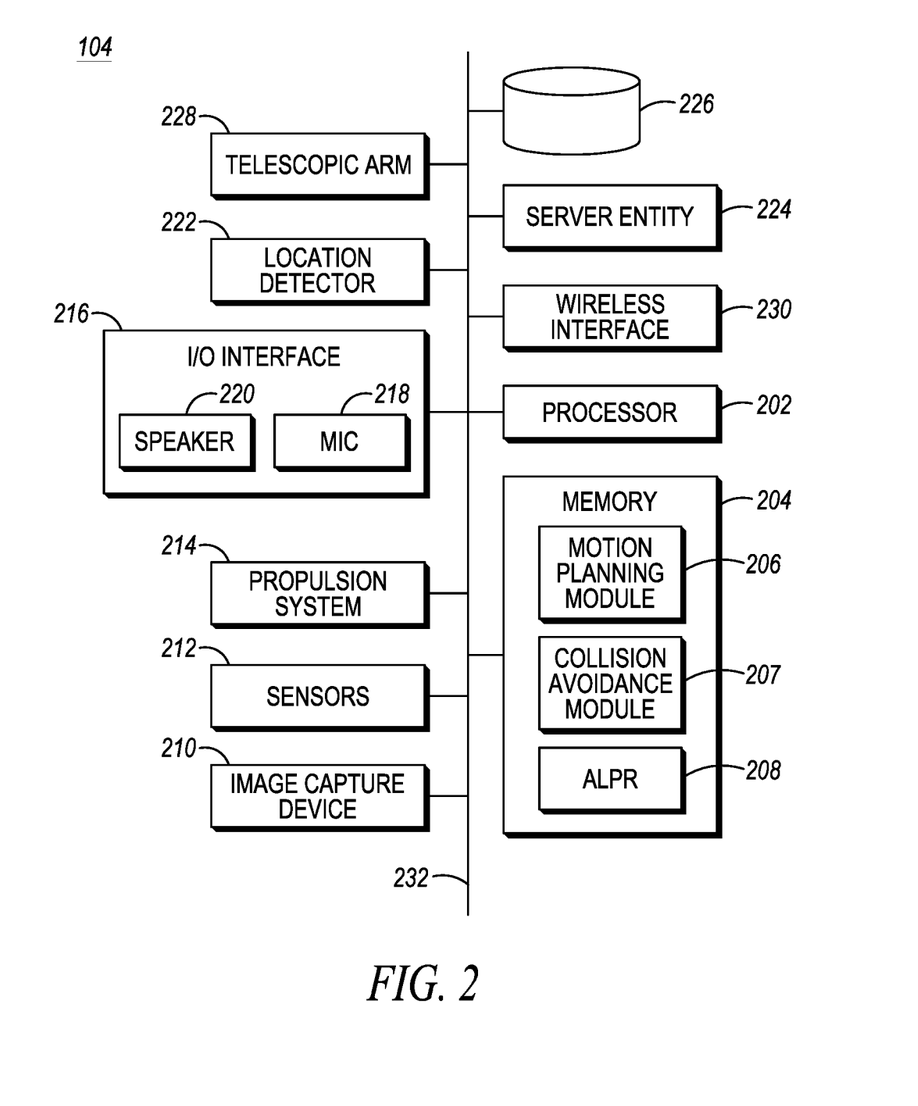
FIG. 2 is a block diagram of an unmanned robotic vehicle of the communication system of FIG. 1 in accordance with some embodiments of the present invention.

Referring now to FIG. 2, a block diagram of URV 104 is provided in accordance with some embodiments of the present invention. As shown, URV 104 generally includes a processor 202, at least one memory device 204, an image capture device 210, one or more sensors 212, a propulsion system 214, one or more input/output (I/O) interfaces 216, a location detector 222, and one or more wireless interfaces 230. Optionally, URV 104 further may include a server entity 224 and a database 226 accessible by the server entity, which server entity and database perform functionality similar to, and store data similar to, the functionality and data described herein as being performed by, and stored by, server 142 and public safety content databases 144-147. Additionally, URV 104 optionally may include a telescopic arm 228. The components (202, 204, 210, 212, 214, 216, 222, 224, 226, 228, 230) of URV 104 are communicatively coupled via a local interface 232. Local interface 232 can be, for example but not limited to, one or more buses or other wired or wireless connections, as is known in the art. Local interface 232 can have additional elements, which are omitted for simplicity, such as controllers, buffers (caches), drivers, repeaters, and receivers, among many others, to enable communications. Further, local interface 232 may include address, control, and/or data connections to enable appropriate communications among the aforementioned components. It should be appreciated by those of ordinary skill in the art that FIG. 2 depicts URV 104 in an oversimplified manner, and a practical embodiment may include additional components and suitably configured processing logic to support known or conventional operating features that are not described in detail herein.

URV 104 operates under the control of processor 202, such as one or more microprocessors, microcontrollers, digital signal processors (DSPs), combinations thereof or such other devices known to those having ordinary skill in the art. Processor 202 operates the corresponding communication device according to data and instructions stored in the at least one memory device 204, such as random access memory (RAM), dynamic random access memory (DRAM), and/or read only memory (ROM) or equivalents thereof, that stores data and instructions that may be executed by the corresponding processor so that the communication device may perform the functions described herein.

The data and instructions maintained by at least one memory device 204 include software programs that include an ordered listing of executable instructions for implementing logical functions. For example, the software in at least one memory device 204 includes a suitable operating system (O/S) and programs. The operating system essentially controls the execution of other computer programs, and provides scheduling, input-output control, file and data management, memory management, and communication control and related service. The programs may include various applications, add-ons, etc. configured to provide user functionality with URV 104.

At least one memory device 204 further maintains a motion planning module 206, a collision avoidance module 207, and an automated license plate recognition (ALPR) module 208. Motion planning module 206 comprises a set of data and instructions that, when executed by processor 202, generates motion instructions for propulsion system 214. That is, motion planning module 206 is able to issue motion instructions to propulsion system 214 based on sensor readings, motion instruction received from public safety agency 140, motion correction provided by collision avoidance module 207, and coarse location of the object/vehicle given by an operator of URV 104. When executing a task, motion planning module 206 may continuously determine current location information and provide motion instructions to propulsion system 214. Collision avoidance module 207 comprises a set of data and instructions that, when executed by processor 202, detects and avoids collisions with objects/vehicles. Collision avoidance module 207 utilizes image capture device 210 and the one or more sensors 212 to detect, and avoid collisions with, objects/vehicles. For example, in response to detecting an object or vehicle, collision avoidance module 207 may generate collision avoidance instructions that may be provided to motion planning module 206 and/or propulsion system 214 to prevent a collision with the detected object or vehicle. ALPR module 208 comprises image processing technology that transforms a license plate image captured by image capture device 210 into a text of the license plate state and number, thereby facilitating a search of a vehicle registration database, such as database 145, or an RMS database, such as database 147, for vehicle registration or criminal information associated with the imaged license plate.

Image capture device 210, such as a camera or a video recording device, and the one or more sensors 212 may be used to generate images, such as 2D and 3D images, of an object or vehicle of interest, such as object vehicle 102, and further to determine location information that allow for URV 104 to measure its position with respect to, and its distance from, an object or vehicle. The one or more sensors 212 may include such sensors as a laser scanner and/or ultra-sonic range finder, a compass, an altimeter, an accelerometer, and other sensors known in the art that may allow URV 104 to determine a relative location, orientation, and proximity of an object or vehicle, such as object/vehicle 102. These sensors are used by motion planning module 206 and collision avoidance module 207 in order to determine a movement direction and a destination for URV 104. Additionally, by combining information collected by image capture device 210 and the one or more sensors 212, such as the laser scanner and/or ultra-sonic range finder, URV 104 is able to generate a 3D image, from at least a side view, of an object or vehicle. Further, the one or more sensors 212 may include environmental condition detection sensors that detect various physical conditions of the environment around URV 104. For example the, such environmental condition detection sensors may include an electronic nose sensor that detects and analyzes substances in the air around URV 104 or a portable substance analyzer, such as a narcotics analyzer, capable of analyzing a physical substance, for example, retrieved by telescopic arm 228, for its chemical makeup.

Propulsion system 214 comprises multiple physical motion generation devices, such as motors, gears, belts, and wheels in the event of a UGV, or one or more propeller systems each comprising one or more propellers and associated propeller circuitry, and/or one or more duct engines, such as jet engines, in the event of a UAV. In response to receiving instructions from processor 202, propulsion system 214 generates a physical movement of URV 104, including a maintaining of a current airborne position of a URV 104 in the event that it is a UAV. For example, as depicted in FIG. 1, propulsion system 214 comprises four propeller systems, each propeller system located at one of four corners of URV 104, that are capable of moving the URV up and down and in any lateral direction.

Motion planning module 206 and collision avoidance module 207 are used to make motion adjustments to properly position URV 104. More particularly, appropriate motion instructions are sent to propulsion system 214 in order to properly position URV 104. In doing so, collision avoidance module 207 may take precedence and may override any instructions from motion planning module 206. Thus, during operation, motion planning module 206 may generate instructions for propulsion system 214 to execute a particular route through an area as part of the execution of a task or to position itself in a particular location and/or orientation with respect to object/vehicle 102. That is, processor 202 may utilize motion planning module 206 to properly navigate the URV to a specific position in relation to the detected object/vehicle, at which position processor 202 may utilize image capture device 210 and sensors 212 to locate, scan, and collect images of the detected object/vehicle.

The one or more I/O interfaces 216 include user interfaces that allow a person to input information in, and receive information from, URV 104. For example, the user interfaces may include a keypad, a touch screen, a scroll ball, a scroll bar, buttons, bar code scanner, and the like. Further, the user interfaces may include a display screen, such as a liquid crystal display (LCD), touch screen, and the like for displaying system output. Additionally, the user interfaces may include a microphone 218 via which a person can input audio into the URV, and a speaker 220 via which the person can receive audio from the URV. I/O interfaces 216 also can include, for example, a serial port, a parallel port, a small computer system interface (SCSI), an infrared (IR) interface, a universal serial bus (USB) interface, and the like for communicating with, or coupling to, an external device.

Location detector 222 determines a geographical location of URV 104. Location detector 222 may comprise, for example, a GPS receiver and/or may comprise circuitry, for example, one or more antennas and a microprocessor, such as being implemented by processor 202, by which URV 104 may receive signals from multiple base stations and determine its location based on the received signals, such as based on a time differences of arrival (TDOA) among such signals and/or triangulation. In still other exemplary embodiments of location detector 222, URV 104 may transmit, via the one or more wireless interfaces 230, a signal to each of multiple base stations, which may in turn determine a location of the URV based on time differences of arrival (TDOA) among the signals received at each such base station and/or triangulation and then one or more of the base stations may transmit the determined location back to the URV. Based on the signals received from the one or more base stations, location detector 222 then determines the location of the URV. In yet other embodiments of the present invention, location detector 222 may include ultrasonic and/or ultra-wideband transmitter/receiver circuitry capable of engaging in wireless communications with ultrasonic and/or ultra-wideband transmitter/receiver circuitry of one or more nearby public safety response vehicles, such as public safety response vehicles 109. Based on such communications, a processor of the location detector or processor 202 may determine a location of the URV as known in the art.

The one or more wireless interfaces 230 facilitate an exchange of wireless communications with other communication devices, such as mobile devices of emergency responders 106 and 108, a DVRS of public safety response vehicle 109, and with wireless network 120. For example, the one or more wireless interfaces 230 may include standard wide area network (WAN), wireless local area network (WLAN), short-range (such as Bluetooth), and/or ultrasonic or ultra-wideband wireless transmission and receiving circuitry (that is, transceivers) for transmitting and receiving audio, video, and messaging with wireless network 120, and via the wireless network, network-based server 142, with the mobile devices of emergency responders 106 and 108, with a DVRS of public safety response vehicle 109, and with an operator of URV 104.

Figure 3:
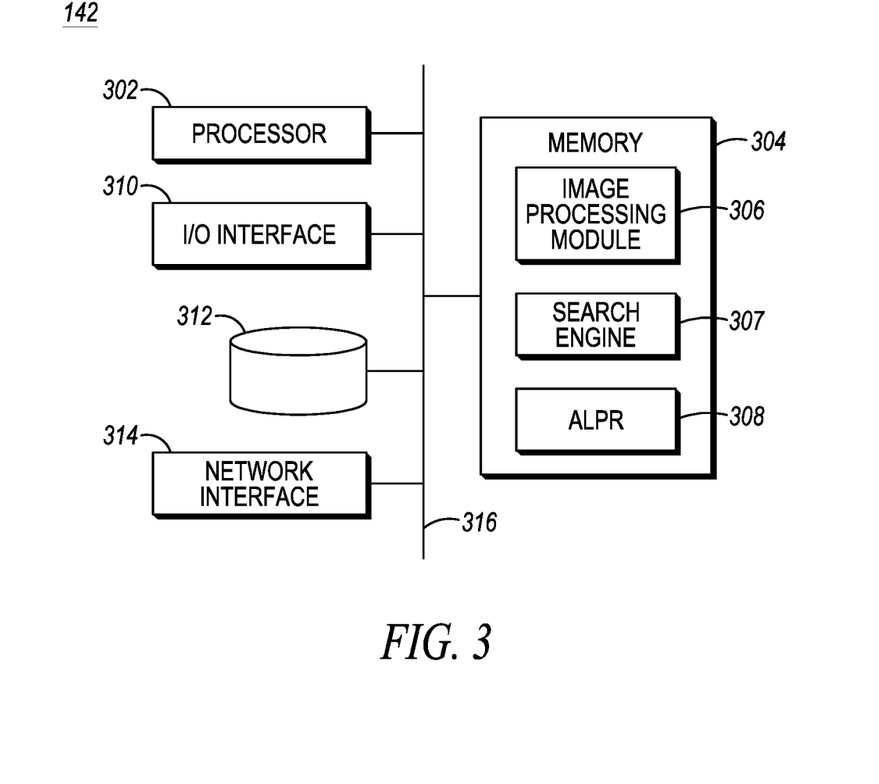
FIG. 3 is a block diagram of a server of the communication system of FIG. 1 in accordance with some embodiments of the present invention.

Referring now to FIG. 3, a block diagram of server 142 is provided in accordance with some embodiments of the present invention. As noted above, server 142 may be located at local public safety agency 140, at public safety response vehicle 109, and/or at URV 104. Server 142 generally includes a processor 302, at least one memory device 304, one or more input/output (I/O) interfaces 310, a database 312, and a network interface 314. The components (302, 304, 310, 312, 314) of server 142 are communicatively coupled via a local interface 316. Local interface 316 can be, for example but not limited to, one or more buses or other wired or wireless connections, as is known in the art. Local interface 316 can have additional elements, which are omitted for simplicity, such as controllers, buffers (caches), drivers, repeaters, and receivers, among many others, to enable communications. Further, local interface 316 may include address, control, and/or data connections to enable appropriate communications among the aforementioned components. It should be appreciated by those of ordinary skill in the art that FIG. 3 depicts server 142 in an oversimplified manner, and a practical embodiment may include additional components and suitably configured processing logic to support known or conventional operating features that are not described in detail herein.

Server 142 operates under the control of processor 302, such as one or more microprocessors, microcontrollers, digital signal processors (DSPs), combinations thereof or such other devices known to those having ordinary skill in the art. Processor 302 operates server 142 according to data and instructions stored in the at least one memory device 304, such as random access memory (RAM), dynamic random access memory (DRAM), and/or read only memory (ROM) or equivalents thereof, that stores data and instructions that may be executed by the corresponding processor so that the server may perform the functions described herein.

At least one memory device 304 includes an image processing module 306, a search engine 307, and, optionally, an ALPR module 308. Image processing module 206, when executed by processor 202, converts an image that is received, for example, from URV 104 via network interface 314, into a machine readable format, that is, searchable code that may be executed by search engine 307 to search database 312 and public safety content databases 144-147, or which searchable code may be conveyed to, and executed by, a search engine of such databases. In turn, databases 312 and 144-147 store images and data that may be searched by search engine 307. When URV 104 captures an image of a license plate, the image may be transformed into a text of the license plate state and number by an ALPR module of the URV or by ALPR module 308 of server 142. Network interface 314 provides for an exchange of communications with data network 130, and via the data network, with other elements of public safety agency 140, such as public safety content databases 144-147, and with wireless network 120 (and via the wireless network, with URV 104, public safety responders 106 and 108, and a DVRS of public safety response vehicle 109).

Unless otherwise specified herein, the functionality described herein as being performed by URV 104 and server 142 is implemented with or in software programs and instructions stored in the respective at least one memory device 204, 304 of the URV and server and executed by the associated processor 202, 302 of the URV and server.

Figure 4A:
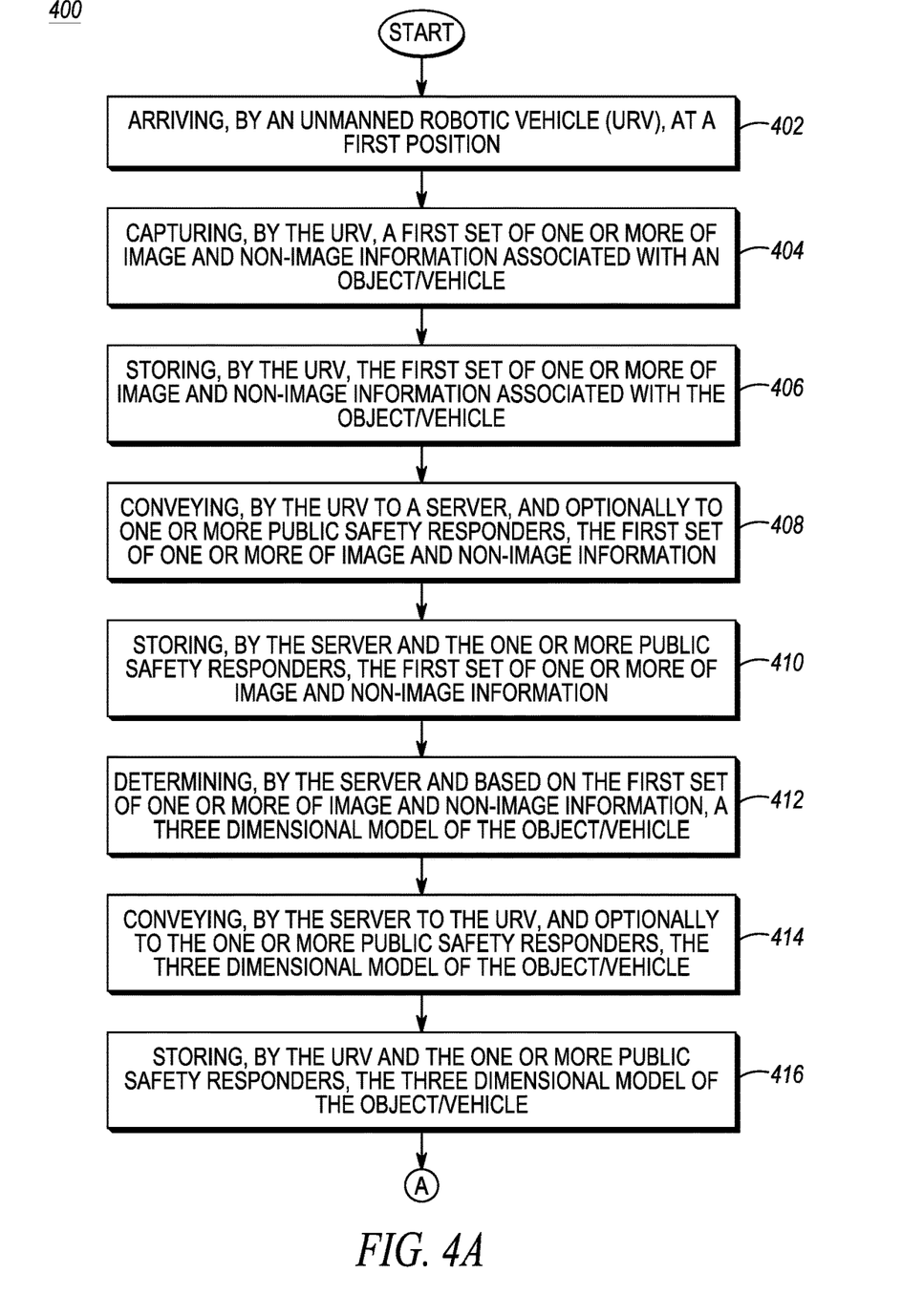
FIG. 4A is a logic flow diagram illustrating a method executed by the communication system of FIG. 1 in positioning an unmanned robotic vehicle in accordance with some embodiments of the present invention.
Figure 4B:
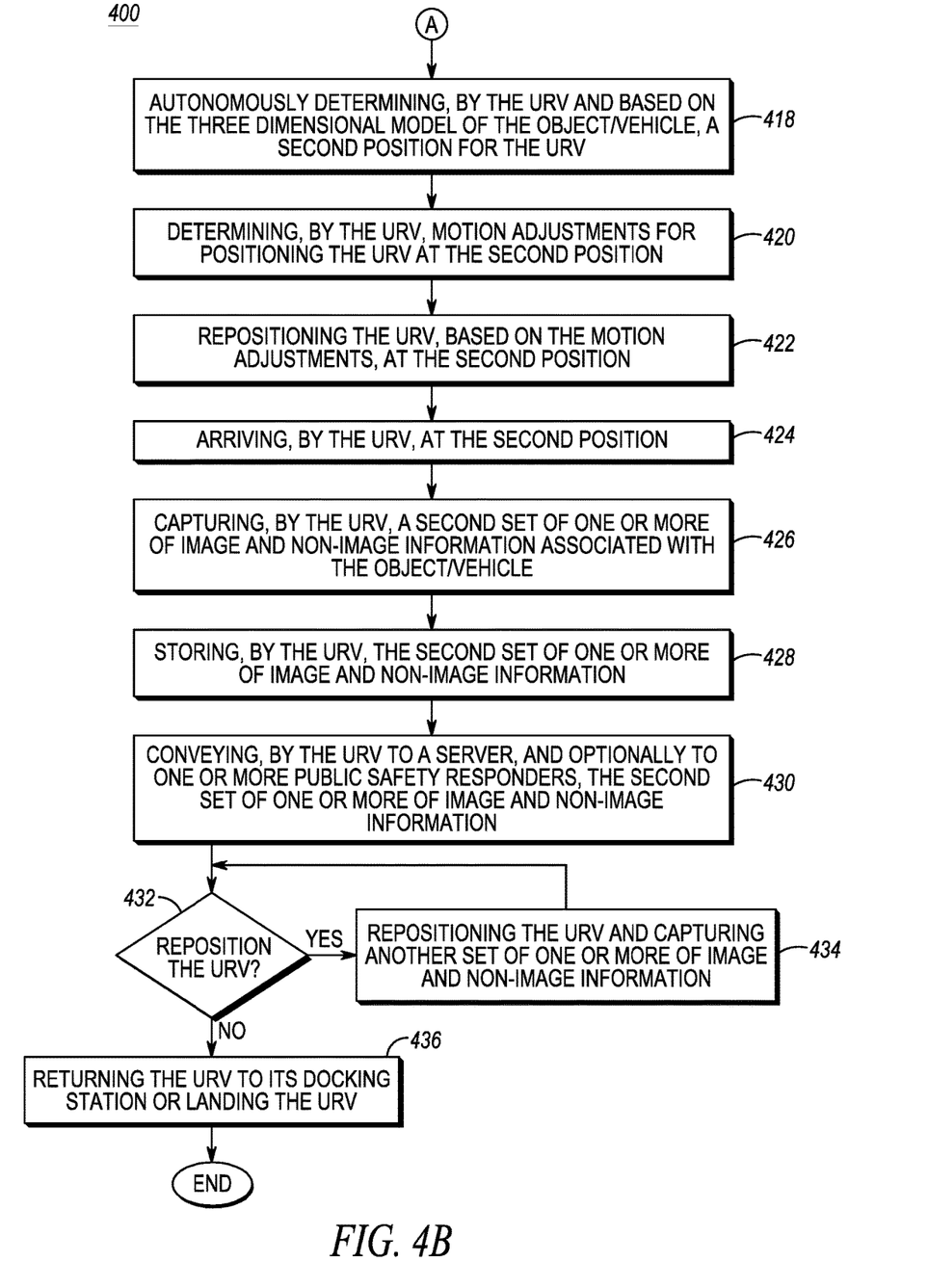
FIG. 4B is a continuation of the logic flow diagram of FIG. 4A illustrating a method executed by the communication system of FIG. 1 in positioning an unmanned robotic vehicle in accordance with some embodiments of the present invention.

Referring now to FIGS. 4A and 4B, a logic flow diagram 400 is provided that illustrates a method by which communication system 100 positions URV 104 in accordance with some embodiments of the present invention. Logic flow diagram 400 begins when URV 104 arrives (402) at a first position proximate to object/vehicle 102. In various embodiments of the present invention, URV 104 may be directed to incident scene 110 by a system operator of public safety agency 140, or one of the public safety responders 106, 108 may transport the URV to incident scene 110 and release the URV at or nearby the incident scene. For example, URV 104 initially may be docked in a docking station of public safety response vehicle 109 and public safety responder 108 may activate the URV in response to arriving at or near incident scene 110.

In some embodiments of the present invention, the first position may be a position self-selected by URV 104. For example, as URV 104 approaches object/vehicle 102, the URV may capture a video stream, via image capture device 210, of object/vehicle 102. The unmanned vehicle may determine a blur metric for each of multiple frames of the video stream and, based on the blur metrics, determine that it has attained a position at which it is able to capture a focused image of object/vehicle 102. A blur metric comprises a determination whether an image present in one or more video frames is 'blurry' or 'sharp.' That is, the image may be determined to be blurry when a blur metric determined for the image is less than a blur metric threshold, and the image may be determined to be sharp when the blur metric determined for the image is greater than the blur metric threshold. When the URV 104 determines that it has captured a 'sharp' image of object/vehicle 102, then the URV may determine that it has attained a position at which it is able to capture a focused image of object/vehicle 102 and stabilize itself at that position.

In some embodiments of the present invention, the first position may be a position to which the URV 104 is directed by one of public safety responders 106 and 108, such as public safety responder 108, or system operator of public safety agency 140. For example, mobile devices associated with each of the public safety responders may include a display screen that is capable of displaying images, for example, a video stream, captured by image capture device 210 of URV 104 and transmitted, via wireless interface 230 of the URV, to the mobile device. When the images indicate a desired position of the URV, the public safety responder, that is, public safety responder 108, or the system operator may instruct the URV to stabilize at that position.

In response to arriving at the first position, URV 104 captures (404), using image capture device 210 and optionally the one or more sensors 212, a first set of one or more of image and non-image information of the object/vehicle 102 and, optionally, non-image information, which first set of one or more of image and/or non-image information facilitates a search, by server 142 (or by server entity 224 of URV 104) for a three-dimensional model of the object/vehicle. In various embodiments of the present invention, the first set of one or more of image and/or non-image information may include a two-dimensional (2D) image of the object/vehicle, a three-dimensional (3D) image of the object/vehicle, and/or license plate information of a vehicle. For example, URV 104 may capture one or more still images of object/vehicle 102 and/or a video stream of the object/vehicle. Further, URV 104 may use the one or more sensors 212 to determine a distance to object/vehicle 102 and/or three-dimensional contours of the object/vehicle. For example, using a laser scanner, URV 104 may be able to determine a distance to the object/vehicle and a three-dimensional side view of the object/vehicle. By way of further example, the first set of one or more of image and non-image information may include license plate information, which license plate information may be used by server 142, by reference to a vehicle registration database, such as database 145, to determine a make and model of the vehicle and, by reference to a vehicle make and model database, such as database 144, a three-dimensional image of the vehicle.

URV 104 then stores (406) the first set of one or more of image and non-image information associated with the object/vehicle in at least one memory device 204 and conveys (408) the first of one or more of image and non-image information associated with the object/vehicle and non-image information to server 142, for example, to public safety agency 140 or public safety response vehicle 109 in the event that server 142 is located in either one. In the event that server 142 is located in the URV, that is, server entity 224, then the URV routes the first of one or more of image and non-image information associated with the object/vehicle to server 224. URV 104 also may convey the first of one or more of image and non-image information associated with the object/vehicle to one or more of public safety responders 106 and 108, that is, to mobile devices of the one or more public safety responders.

In response to receiving the first of one or more of image and non-image information associated with the object/vehicle, each of server 142 and the mobile devices of the one or more public safety responders stores (410) the first of one or more of image and non-image information associated with the object/vehicle. For example, server 142 may store the first set of one or more of image and non-image information in at least one memory device 204, 304 or in an associated database 226, 312. Server 142 determines (412), by reference to the one or more public safety content databases 144-147 and based on the first set of one or more of image and non-image information, information identifying the object/vehicle and a 3D model of the object/vehicle. For example, in response to capturing the first set of one or more of image and non-image information associated with the object/vehicle, URV 104, and in particular server entity 224, may determine, by reference to database 226 or public safety agency databases 144-147, information identifying the object/vehicle and a 3D model of the object/vehicle.

Server 142 then conveys (414) the identification information and the 3D model back to URV 104 and, optionally, to the one or more of public safety responders 106 and 108 (that is, to mobile devices associated with the one or more of public safety responders). In response to obtaining the identification information and the 3D model from server 142, URV 104 and the one or more public safety responders (that is, the mobile devices of the one or more public safety responders) store (416) the received identification information and 3D model of the object/vehicle, for example, the URV in at least one memory device 204. Further, URV 104 autonomously determines (418) a second position for itself, from which position the URV can capture more images and non-image information associated with object/vehicle 102.

In response to determining the second position, URV 104 autonomously navigates (420, 422) itself to the second position. For example, in response to determining the second position, URV 104 then uses motion planning module 206 and collision avoidance module 207 to determine (420) motion adjustments for positioning the URV at the second position. For example, URV 104, using motion planning module 206 and collision avoidance module 207, may determine appropriate motion instructions for moving the URV to the second position. URV 104 then routes the motion instructions to propulsion system 214 and, based on the motion instructions, the propulsion system repositions (422) the URV at the next position. Thus, during operation, URV 104 will instruct propulsion system 214 to execute a particular route through incident scene 110 as part of the execution of a task. At a coarse location of the second position, URV 104 may use image capture device 210, location detector 222, and/or sensors 212 to search for the next position relative to object/vehicle 102 and, if needed, URV 104 may use collision avoidance module 207 and/or sensors 212 to fine tune the positioning of the URV in relation to object/vehicle 102.

In response to arriving (424) at the second position, URV 104 captures (426), using one or more of image capture device 210 and the one or more sensors 212, a second set of one or more of image and non-image information associated with the object/vehicle. For example, URV 104 may capture additional images, such as a license plate, a vehicle occupant, a weapon, an explosive, and/or another still image or video stream of the object/vehicle. By way of further examples, URV 104 may use the one or more sensors 212 to detect and analyze an environmental condition at the second position, such as any substances that may be circulating in the air, for example, sensing explosives, ammunition, or drugs, or URV 104 may use telescopic arm 228 to retrieve a physical object at the second position. Further, in the event that URV retrieves a physical object at the second position, URV 104 may use the one or more sensors 212, for example, a substance analyzer, to determine a composition of the physical object. URV 104 then stores (428) the second set of one or more of image and non-image information, such as the detected environmental condition or the substance analysis, in at least one memory device 204 of the URV, and conveys (430) the second set of one or more of image and non-image information to server 142, again, for example, in URV 104, public safety response vehicle 109, or public safety agency 140, and further to public safety responders 106 and 108, that is, to mobile devices of the one or more public safety responders.

In one embodiment of the present invention, in response to conveying the second set of one or more of image and non-image information to server 142 and public safety responders 106 and 108, URV 104 may receive information back that triggers the URV to autonomously determine (432) to move to a third position, from which position the URV can capture more image and/or non-image information associated with object/vehicle 102. In the event of determining to move to a third position, URV 104 autonomously repositions itself, that is, autonomously navigates (434) itself to the third position, as described above, to the third position and, in response to arriving at the third position, captures (434), a third set of one or more of image and non-image information associated with the object/vehicle using one or more of image capture device 210, the one or more sensors 212, and telescopic arm 228. URV 104 further stores the third set of one or more of image and non-image information, along with any analysis performed by the URV on the non-image information, in at least one memory device 204 of the URV, conveys the third set of one or more of image and non-image information to server 142 and public safety responders 106 and 108, that is, to mobile devices of the one or more public safety responders, and may receive back information back that triggers the URV to autonomously determine to move to yet another position.

The above steps of autonomously determining (432) a new position, autonomously navigating to the new position, and capturing additional image and/or non-image information at the new position, may be repeated indefinitely until the URV determines (432) not to reposition itself and/or is instructed to return to its docking station or to land (in the event of a UAV, where the UAV may be picked up by a public safety responder 106, 108), in which event URV 104 returns (436) to its docking station or lands. Logic flow 400 then ends. For example, server 142 or the one or more public safety responders 106, 108 may instruct the UAV to return to its docking station or to land. By way of another example, when the URV receives no further information response to conveying a set of one or more of image and non-image information associated with the object/vehicle, or the information received back from server 142 or public safety responders 106, 108 does not provide URV 104 with information adequate, or of a type, to permit the URV to determine another position for capturing further images of object/vehicle 102, URV 104 may return to its docking station or land.

In some embodiments of the present invention, public safety responders 106 and 108 may, at any time, convey an instruction to URV 104 that overrides any of the steps described with respect to FIG. 4. That is, after receiving any of the sets of one or more of image and non-image information associated with the object/vehicle, one of public safety responders 106 and 108 may determine a preferred next behavior for URV 104. In such an event, the public safety responder may convey instructions to URV 104 to perform the preferred behavior, such as move to a position identified by the public safety responder and/or to collect image and/or non-image information desired by the public safety responder. In such an event, at least one memory device 204 of URV 104 may include task prioritization information, which task prioritization information identifies tasks that are prioritized over other tasks. For example, any task that is requested by public safety agency 140 and/or a public safety responder 106, 108 has priority over any task that otherwise would be autonomously performed by the URV.

Further, in some embodiments of the present invention, a captured image and/or non-image information may trigger URV 104 to convey an alert to public safety agency 140 and or public safety responders 106 and 108 or to autonomously alter a behavior that is one of being performed or is planned to be subsequently performed, for example, in the event that the URV detects a conflict in information captured by the URV. For example, an alert may be triggered by the URV 104 if the URV determines that a 3D model of a vehicle does not match registration information associated with captured license plate information. Or, in the event of detecting such a conflict, the URV may determine not to move to a next position, or to move to a position that reflects such a conflict. For example, instead of moving a next position, the URV may return to a docking station, or search for weapons instead of capturing images of occupants, or capture environmental information or physical substances. By way of further example, the URV may determine to capture further image or non-image information instead of returning to a docking station, or may determine to wait for an instruction from public safety responders 106 and 108 before taking any further action.

Additionally, in some embodiments of the present invention, an autonomous repositioning by URV 104 may include selection of a behavior from among multiple alternative behaviors, depending upon the details of the information received back from server 142. For example, in response to receiving information concerning occupants of a vehicle, and further based on any criminal record information associated with the vehicle, URV 104 may determine to reposition itself at one or more of multiple possible next positions. For example, if the vehicle is stolen then the URV may perform a circle of the vehicle to capture images from all possible angles and to capture images via all passenger windows, while if there is no indication of any criminal activity associated with the vehicle then the URV may merely position itself proximate to the driver, for example, alongside the driver's side window or in front of the windshield on the driver's side of the vehicle.

For example, and merely for the purpose of illustrating the principles of the present invention, suppose a public safety responder in a public safety response vehicle, such as public safety responder 108, pulls over a passenger vehicle, such as a car, and using a loudspeaker of the public safety response vehicle, requests that the operator of the passenger vehicle present his or her driver's license. Public safety responder 108 may release URV 104, which then assumes a position proximate to the passenger vehicle, captures an image of the passenger vehicle that the URV conveys to server 142, receives a 3D image of the passenger vehicle from the server (which the server obtained from vehicle make/model database 144), and determines, based on the three-dimensional image, a location of the driver's window of the passenger vehicle. URV 104 then may reposition itself by the driver's window and, in response to a request by public safety responder 108 that the driver present his or her driver's license, capture an image of the driver's license and convey the image of the driver's license to server 142. In response to receiving the image, server 142 may convey back, to the URV and public safety responder, information concerning the driver (for example, which the server may obtain from one or more of vehicle registration database 146 and criminal records database 147), thereby allowing public safety responder 108 to determine a level of caution that he or she should exercise in approaching the car and in interacting with the driver.

By way of further example, suppose a public safety responder, such as public safety responder 108, pulls over a vehicle, such as a car or a truck, suspected to be related to a commission of a crime. However, a positioning of the vehicle may block a view of public safety responder 108, so that the public safety responder is unable to clearly see the suspect or see whether the suspect may be hiding a weapon. Accordingly, public safety responder 108 may release URV 104, which then assumes a position proximate to the vehicle, captures an image of the vehicle that the URV conveys to server 142, receives back from the server a 3D image of the car, and then determines, based on the 3D image, other positions around the vehicle from which the URV may capture further images of, and correspondingly obtain further information regarding, a suspect and the vehicle.

That is, suppose that URV 104 has, at a first position, positioned itself proximate to a vehicle and captured a first set of one or more of image and non-image information associated with the vehicle. URV 104 then conveys the first set of one or more of image and non-image information associated with the vehicle to server 142. Server 142, utilizing image processing module 306, analyzes the first set of one or more of image and non-image information associated with the vehicle to produce searchable vehicle information. Server 142, utilizing search engine 307, may query vehicle make/model database 144 for vehicle information associated with the first set of one or more of image and non-image information. In response to the query, vehicle make/model database 144 may return vehicle identification information to server 142, such as vehicle make and model information (for example, a Buick (vehicle make) LaCrosse (vehicle model)) and a 3D model of the vehicle. Server 142 then may convey the vehicle identification information to URV 104 and, optionally, to one or more of public safety responders 106 and 108 (that is, to their associated mobile devices), and the URV and one or more public safety responders then may store the received vehicle identification information.

Based on the received 3D model of the vehicle, URV 104 may autonomously determine a second position and motion adjustments for positioning the URV at the second position, where the URV can capture a second set of one or more of image and non-image information associated with the vehicle. For example, based on the 3D model of the vehicle, URV 104 may autonomously determine where license plates are located on the vehicle and determine motion adjustments for positioning the URV at a position where the URV can capture one or more images of the license plate. URV 104 then positions itself at the second position and captures the second set of one or more of image and non-image information associated with the vehicle, for example, images of the license plate, which ALPR module 208 converts to text to produce searchable vehicle registration information, such as a number and state of an imaged license plate that then is conveyed to server 142 (or which image is conveyed to server 142, where ALPR module 308 of the server converts the image to text to produce searchable vehicle registration information). Further, if ALPR module 208 is unable to read the license plate image captured by image capture device 210, URV 104 may repeatedly reposition itself, capturing an image of the license plate at each position, until the URV is able to capture a clear image of the license plate.

In response to receiving the second set of one or more of image and non-image information associated with the vehicle, server 142 then may query vehicle registration database 145 for vehicle information associated with the vehicle registration information. In response to the query, vehicle registration database 145 may return, to the server, vehicle registration information associated with the imaged license plate, for example, vehicle owner information such as a vehicle owner's name, address, and driver's license number. Further, based on the vehicle registration information and vehicle owner information, server 142 may query criminal records database 147 to determine vehicle-related criminal record information, that is, criminal record information associated with the vehicle and vehicle owner, such as whether the vehicle is stolen and any criminal record associated with the vehicle owner. In response to the query of criminal records database 147, the criminal records database may return, to server 142, criminal record information associated with the vehicle and/or vehicle owner. Server 142 then may convey the vehicle registration information, vehicle owner information, and vehicle-related criminal record information to URV 104 and, optionally, to one or more of public safety responders 106 and 108, and the URV and one or more public safety responders then may store the received vehicle registration information, vehicle owner information, and vehicle-related criminal record information.

The receipt of vehicle-related criminal record information by URV 104 then may trigger the URV to determine a third position and motion adjustments for positioning the URV at the third position, where the URV can capture a third set of one or more of image and non-image information associated with the vehicle. For example, in response to receiving any kind of criminal records information and based on the stored 3D model of the vehicle, URV 104 may autonomously determine where windows are located on the vehicle and determine motion adjustments for positioning the URV at a position where the URV can capture one or more images of the windows, such as a front windshield and/or a side window, and more particularly capture images of vehicle occupants through the windows.

URV 104 then may position itself at the third position and capture the third set of one or more of image and non-image information associated with the vehicle, that is, images of the windows and, via the windows, the vehicle occupants. URV 104 then may convey the third set of one or more of image and non-image information to server 142 and the server, utilizing image processing module 306 and, in this instance, facial recognition software, may analyze the third set of one or more of image and non-image information of the vehicle to produce searchable facial recognition information.

Server 142 may again query criminal records database 145, this time for information associated with the facial recognition information. In response to the query, vehicle registration database 145 may return, to the server, individual-based criminal records information, such as the names and criminal records of the occupants of the vehicle captured in the third set of one or more of image and non-image information. Server 142 then may convey the individual-based criminal records information to URV 104 and, optionally, to the one or more of public safety responders 106 and 108, and the URV and one or more public safety responders then may store the received individual-based criminal records information.

The receipt of individual-based criminal records information by URV 104 may trigger the URV to determine a fourth position and motion adjustments for positioning the URV at the fourth position, where the URV can capture a fourth set of one or more of image and non-image information associated with the vehicle, such as any weapons that may be located inside of the car, or capture non-image information, such as environmental information or physical substance-related information. URV 104 then may position itself at the fourth position, capture the fourth set of image and/or non-image information, and convey the fourth set of image and/or non-image information to server 142. Server 142, by reference to weapons/explosive device/chemical material database 146, may identify any weapons visible in the fourth set of image and/or explosive device or chemical material information and return corresponding weapon, explosive device, or chemical material information to URV 104 and the one or more of public safety responders 106 and 108, and the URV and one or more public safety responders then may store the received weapon identification information. Thus, the images and information collected by URV 104 and provided to server 142, and the information returned by the server to the URV, may allow a public safety responder to better assess a situation with respect to the object and determine follow up actions while minimizing personal risk to the public safety responder, such as calling for back up without having to first approach the vehicle on foot.

It may be further appreciated that while the above examples concern a URV positioning itself around a vehicle, the URV may autonomously determine where to position itself around all kinds of objects, for example, at a window of a house or a building based on an initially captured image of the house or building, or around an explosive device or a person based on the initially captured image of the device or person.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for positioning an unmanned robotic vehicle (URV) for capture of additional vehicular object information, the method comprising:
    capturing, by the URV via an image capture device, first image information of a vehicular object of interest while positioned at a first position;
    providing, by the URV, the first image information, or non-image information extracted from the first image information, to a server entity;
    in response to the providing, receiving, by the URV, a three-dimensional model of a same make and model of the vehicular object;
    autonomously determining, by the URV, a second position proximate to a window of the vehicular object based on the received three-dimensional model;
    autonomously navigating the URV to the second position; and
    capturing, by the URV via the image capture device while at the second position, second image information of the vehicular object.

2. The method of claim 1, wherein the server entity is a component of the URV.

3. The method of claim 1, wherein the server entity is an infrastructure-based server.

4. The method of claim 3, wherein the first image information comprises an image of a license plate on the vehicular object and wherein the method further comprises:
    determining, by the server, the vehicle make and model of the vehicular object based on the first image information;
    obtaining, by the server via a license plate database, the three-dimensional model based on the determined vehicle make and model; and
    conveying, by the server to the URV, the obtained three-dimensional model.

5. The method of claim 1, wherein the first image information comprises one or more of a three-dimensional image of the vehicular object, a two-dimensional image of the vehicular object, and an image of a license plate on the vehicular object.

6. The method of claim 5, wherein autonomously determining the second position based on the three-dimensional model comprises determining the second position for capturing an image of a vehicle occupant via the window of the vehicular object.

7. The method of claim 1, wherein the method further comprises:
    autonomously determining, by the URV, a third position based on the second image information; and
    autonomously navigating the URV to the third position.

8. The method of claim 1, wherein the method further comprises:
    conveying, by the URV to one or more of a public safety agency and a public safety responder, the second image information;
    in response to conveying the second image information, receiving, by the URV from the one or more of the public safety agency and the public safety responder, an instruction regarding a next behavior for the URV; and
    executing, by the URV, the next behavior included in the instruction.

9. The method of claim 1, further comprising:
    determining, by the URV, a conflict between one or more images captured by the URV and information determined based on the one or more images; and
    in response to determining the conflict, performing one or more of:
        conveying an alert to one or more of a public safety agency and a public safety responder; and
        autonomously altering a behavior that is one of being performed or is planned to be subsequently performed.

10. The method of claim 1, further comprising:
    detecting, by the URV while at the second position, one or more of a weapon, an explosive device, an environmental condition, and a physical substance associated with the vehicular object; and
    conveying, by the URV to one or more of a public safety agency and a public safety responder, information concerning the detected one or more of the weapon, the explosive device, the environmental condition, and the physical substance associated with the vehicular object.

11. An unmanned robotic vehicle (URV) for capturing additional vehicular object information, the URV comprising:
    a processor;
    a propulsion system;
    one or more wireless interfaces;
    one or more sensors;
    an image capture device; and
    an at least one memory device that is configured to store a set of instructions that, when executed by the processor, cause the processor to perform a set of functions including:
        capture, via the image capture device, first image information of a vehicular object of interest while positioned at a first position;

provide the first image information, or non-image information extracted from the first image information, to a server entity;

in response to the providing, receive a three-dimensional model of a same make and model of the vehicular object;

autonomously determine a second position proximate to a window of the vehicular object based on the received three-dimensional model;

autonomously navigate, via the propulsion system, the URV to the second position; and capture, via the image capture device while at the second position, second image information of the vehicular object.

12. The URV of claim 11, wherein the URV further comprises the server entity, wherein the first image information comprises an image of a license plate on the vehicular object, and wherein the server is configured to:

determine the vehicle make and model of the vehicular object based on the first image information;

obtain, via a license plate database, the three-dimensional model based on the determined vehicle make and model.

13. The URV of claim 11, wherein the first image information comprises one or more of a three dimensional image of the vehicular object, a two-dimensional image of the vehicular object, and an image of a license plate on the vehicular object.

14. The URV of claim 13, wherein the set of functions further include autonomously determine the second position for capturing an image of a vehicle occupant via the window of the vehicular object.

15. The URV of claim 11, wherein the set of functions further comprise:

autonomously determine a third position based on the second image information; and autonomously navigate the URV to the third position.

16. The URV of claim 11, wherein the set of functions further comprise:

convey, to one or more of a public safety agency and a public safety responder, the second image information;

in response to conveying the second image information, receive, from the one or more of the public safety agency and the public safety responder, an instruction regarding a next behavior for the URV; and execute the next behavior included in the instruction.

17. The URV of claim 11, wherein the set of functions further comprise:

determine a conflict between one or more images captured by the URV and information determined based on the one or more images; and in response to determining the conflict, perform one or more of:

convey an alert to one or more of a public safety agency and a public safety responder; and autonomously alter a behavior that is one of being performed or is planned to be subsequently performed.

18. The URV of claim 11, wherein the set of functions further comprise:

detect, while at the second position, one or more of one or more of a weapon, an explosive device, an environmental condition, and a physical substance associated with the vehicular object; and convey, to one or more of a public safety agency and a public safety responder, information concerning the detected one or more of the weapon, the explosive device, the environmental condition, and the physical substance associated with the vehicular object.

* * * * *